Aug. 28, 1956

M. G. CROSBY 2,761,105

SIDEBAND TRANSMITTER

Filed March 27, 1952

2 Sheets-Sheet 1

INVENTOR.
Murray G. Crosby
BY Lippincott & Smith
ATTORNEYS

INVENTOR.
Murray G. Crosby
BY Lippincott & Smith
ATTORNEYS 2,761,105
Patented Aug. 28, 1956

2,761,105

SIDEBAND TRANSMITTER

Murray G. Crosby, Mineola, N. Y.

Application March 27, 1952, Serial No. 278,977
25 Claims. (Cl. 332—41)

The present invention relates to an improved type of sideband transmitter wherein the intelligence is conveyed in the sideband frequencies and the carrier may be substantially suppressed. The transmission system of the present invention is equally capable of providing single or double communication channels. In the former case a single sideband containing the intelligence is transmitted whereas in the latter instance uper and lower sidebands, representative of different intelligence, are transmitted.

Single-sideband transmission has the inherent advantage over other types of transmission in that the amount of sideband energy is greater in proportion to the power rating of the transmitter. The frequency band occupied by the signal is also less and the signal-to-noise ratio is consequently improved. However, as is well known, the single-sideband transmitters and receivers require special precautions if they are to perform properly.

In known prior art sideband transmission systems a single sideband is generated and then raised to the desired power level by linear amplifiers. Linear amplifiers are necessary to prevent distortion of the amplitude modulation. As the linear amplifier is usually a relatively low efficiency device, several stages of amplification are ordinarily employed. Maintaining these amplifiers in correct adjustment also adds to the complexities of the transmitter. Further, it is desirable to employ frequency increase or multiplication in the transmitter in order that the sideband will ultimately modulate a carrier of sufficiently high frequency as to yield good transmission. Such frequency increase is ordinarily achieved by the heterodyne process. A very stable high-frequency oscillator of the crystal type supplies a constant frequency to be heterodyned with the modulated carrier. A filter arrangement is provided to select one of the higher frequency modulated beat notes so developed. The foregoing process of heterodyning and selection is then repeated a sufficient number of times to provide a modulated carrier at the desired transmission frequency.

It is an important purpose of the present invention to provide a sideband transmission system wherein frequency increase or multiplication may be employed throughout the transmitter. This may be accomplished through the employment of conventional multipliers or by the heterodyne process as outlined above. Further, a transmitter is provided wherein amplifiers requiring less complex adjustments (relative to known systems) provide distortion-free amplification.

The transmission system of the present invention provides a single-sideband modulator adapted to operate upon a single signal or a pair of signals. A carrier frequency oscillator supplies the single-sideband modulator with carrier voltage. As will be more fully apparent hereinafter the output of the single-sideband modulator is a resultant wave which has a component of amplitude-modulation and a component of phase-modulation. The amplitude-modulation component of the resultant wave is detected in an amplitude detector, amplified in an audio-frequency amplifier, and then applied to an amplitude modulator located in the output circuit of the transmitter. The component of phase-modulation may be first introduced into a limiter to remove the amplitude-modulation component therefrom. The output of the limiter is detected in a phase detector to obtain a voltage proportional to the instantaneous phase difference between the resultant wave and the original carrier frequency. This voltage is then applied to a phase modulation exciter which includes a phase-variable master oscillator. The frequency of the master oscillator may determine the transmission frequency or circuits capable of providing frequency multiplication may be included in the transmitter to multiply the master oscillator frequency. The output of the phase modulation exciter is amplified in a radio frequency amplifier and the resultant output therefrom is introduced as a carrier into the aforesaid amplitude modulator. Appropriate time delaying networks are provided to equalize the time required for the amplitude and phase components to pass to the amplitude modulator so that these components will be correctly applied to the modulator to be combined in proper order. The amplitude modulator must be of the usual, double sideband type, which will vary the amplitude of the phase-shifted waves without further affecting their phase. Because of the shifting phase of the "carrier," the waves representative of one of the sidebands of this second modulation cancel out and the resultant wave contains substantially only the single sideband. By modulating separate signals on the same carrier frequency and selecting the upper sideband of one signal and the lower sideband of the other two messages may be transmitted simultaneously, and the carrier may be either wholly or partly suppressed. Thus, the amplitude modulator is capable of reproducing at higher level, the signals introduced into the single-sideband modulator.

With the described circuit arrangement the output from the amplitude modulator may be at any desired frequency and power level. The frequency multiplication, if desired, is accomplished in the frequency multipliers and the increased power level is effected through the separate radio and audio frequency amplifiers.

In the prior art systems modulated waves are amplified in linear amplifiers. Usually such amplifiers are of Class B type wherein careful adjustment is required to reduce the nonlinear amplitude distortion to a low degree. In order to obtain a high degree of linearity with the Class B amplifiers, the amplifier tubes are necessarily operated at power levels below their maximum rating. Thus the prior art systems are inefficient in the utilization of the available capabilities of the power amplifier tubes. Amplifiers biased for Class C operation utilize the maximum capabilities of the power tubes. However, when Class C operation is employed much of the amplitude-modulation is removed in the amplifier because of tube saturation. The nonlinearity introduced by amplifiers operating under Class C conditions affects only the amplitude components of the waves to be amplified. Accordingly, the present invention admits of the employment of such high power amplifiers to increase the power level of the output of the phase modulation exciter.

In order to insure a proper output from and to provide control of automatic frequency multiplication in the transmitter of the present invention, suitable circuitry may be added thereto to provide a system of amplitude and phase feedback. In this embodiment means are provided for deriving a voltage representative of the transmitter output amplitude-modulation components. This voltage is then compared with the voltage representative of the amplitude-modulation components as derived from the single-sideband modulator. The difference voltage obtained from this comparison is applied as the amplitude-modulation component input to the amplitude modulator.

In a similar manner a difference voltage representative of the phase-modulation component is obtained. This voltage is then applied as the phase-modulation component input to the phase-modulation exciter.

This system of inverse feedback is somewhat related to that shown and described in application for Letters Patent of the United States, Serial No. 278,976 concurrently filed by this applicant and entitled "Modulated Wave Amplifier," now Patent No. 2,705,775, issued April 5, 1955.

With the foregoing in mind, among the objects of the present invention are: to provide a system of sideband transmission wherein frequency multiplication may be easily effected throughout the transmitter; to provide a transmitter capable of supplying single-sideband transmission or transmission wherein upper and lower sidebands of the same carrier frequency carry separate information, to provide a sideband system of transmission capable of high power output, and to provide a sideband transmission system capable of the automatic control of the output modulation.

Other and further objects of the present invention will become apparent to those skilled in the art from a reading of the following detailed description thereof when taken in conjunction with the accompanying drawings wherein.

Figure 1:
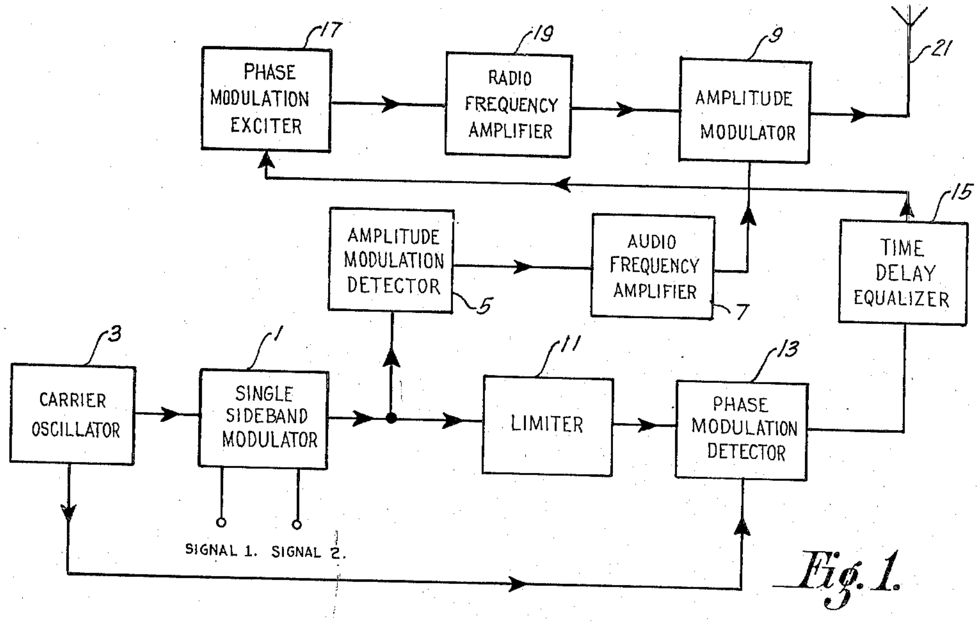
Fig. 1 is a schematic representation in block form of a transmitter in accordance with the present invention.

Referring now to the drawings and particularly to Fig. 1, a dual single-sideband modulator 1 is shown connected to receive a pair of signals designated as signal 1 and signal 2. Oscillator 3 is connected to supply carrier frequency voltage to the sideband modulator 1. Hence, the signals 1 and 2 provide the upper and lower sideband frequencies. In conventional amplitude modulated transmitters the upper and lower sidebands each contain the same intelligence. In contrast with the foregoing the present system provides a pair of communication channels respectively comprising signal 1 and signal 2. The output obtainable from the single-sideband modulator 1 is a resultant wave representative of the modulated carrier wave.

The foregoing may be more apparent from the following mathematical representation thereof. The equation of the single-sideband wave is as follows:

$$e=E_c \sin \omega_c t+E_s \sin \omega_s t \qquad (1)$$

in which $e$ is the instantaneous voltage, $E_c$ represents the amplitude of the carrier component, $E_s$ represents the amplitude of the sideband component, $\omega_c$ represents the angular velocity of the carrier wave, and $\omega_s$ represents the angular velocity of the sideband wave.

The terms appearing on the right hand side of Equation 1 may be combined by means of vector addition to produce the following equation:

$$e=\sqrt{E_c^2+E_s^2+2E_cE_s \cos (\omega_s-\omega_c)t}\ \sin \left(\omega t+ \tan^{-1} \frac{E_s \sin (\omega_s-\omega_c)t}{E_c+E_s \cos (\omega_s-\omega_c)t}\right) \qquad (2)$$

In Equation 2, $e$ represents the resultant voltage obtained from the output of the single-sideband modulator 1. The portion of Equation 2 contained under the square root sign represents the instantaneous magnitude of the resultant wave. This instantaneous magnitude is also a measure of the amplitude component of modulation. The sine term of Equation 2 represents the instantaneous angular position of the resultant wave with respect to the original carrier wave. This term provides a measure of the phase-modulation component of the resultant wave. If the resultant wave is amplified in an amplifier which introduces non-linear distortion the amplitude envelope only will be affected and the phase-component will be unaltered. Hence the present invention provides means for separating the amplitude and phase components so that each component may be separately amplified in the most appropriate manner.

Amplitude detector 5 which is essentially an envelope detector is provided to receive a portion of the resultant wave produced in modulator 1. The output voltage wave derived from detector 5 is amplified in an appropriate audio frequency amplifier 7. The audio frequency voltage wave derived from amplifier 7, which is representative of the amplitude component of modulation, is applied to an amplitude modulator 9.

A portion of the resultant wave output of modulator 1 is also fed to limiter 11. Limiter 11 operates in the conventional manner to remove the amplitude modulation component from the resultant wave. A phase modulation detector 13 of conventional design receives the output of limiter 11 and also a portion of the output of carrier oscillator 3. The detector 13 provides a voltage representative of the phase modulation component of the resultant wave. This voltage is applied through a time-delay equalizer or network 15 to a phase modulation exciter 17.

The exciter 17 may assume any of the conventional designs and is preferably provided with a master oscillator and a limiter. Hence the output of exciter 17 is a phase modulated carrier of constant amplitude. The master oscillator included in exciter 17 is preferably adjustable in frequency so that frequency multiplication as desired may be obtained with the transmitter of Fig. 1. It is not necessary that the master oscillator of exciter 17 be synchronized with the carrier oscillator 3 because as long as each of the oscillators remains constant in frequency a proportional change of phase will be maintained therebetween. As the output of exciter 17 contains no amplitude modulation components, a radio frequency amplifier 19 capable of Class C operation may be employed to substantially increase the power level of the phase modulated carrier. The amplified phase component of modulation is hence introduced to amplitude modulator 9 from amplifier 19.

It is the purpose of amplitude modulator 9 to recombine the amplitude and phase components of modulation to provide a carrier modulated with intelligence in accordance with the signals 1 and 2. In order that a proper output may be provided from modulator 9 it is necessary that the phase and amplitude components of modulation be introduced in their original relation. Ordinarily the components of phase modulation would arrive at the amplitude modulator 9 before their corresponding amplitude components. This is because the voltage representative of the phase component of modulation is carried by radio frequency for a greater portion of its path through the transmitter than the amplitude component voltage. Hence the time-delay equalizer 15 is provided in the phase modulation component path to interpose a time delay for the phase modulation components. By adjusting equalizer 15 the corresponding amplitude and phase components of modulation are introduced into the amplitude modulator 9 in proper time relation.

The amplitude modulator 9 receives the phase modulated carrier from exciter 17 and the amplitude component of modulation from detector 5 and combines them to produce an upper and lower sideband representative respectively of signals 1 and 2 modulated upon the carrier derived from exciter 17. This wave is transmitted for utilization over communication lines or as is herein represented from the antenna 21. It should be noted that the output from antenna 21 may be either a carrier modulated with upper and lower sidebands or a single-sideband modulated upon a carrier. In the latter case a single signal such as a voice communication would be introduced into the singl-sideband modulator 1 as either signal 1 or signal 2. The combination of this signal with the carrier frequency voltage supplied by oscillator 3 would provide a resultant wave as represented by equation 2 at the output of the modulator 1. The remainder of the circuit of Fig. 1 would function in the manner herein set forth to provide a carrier and single-sideband at the output of amplitude modulator 9.

Figure 2:
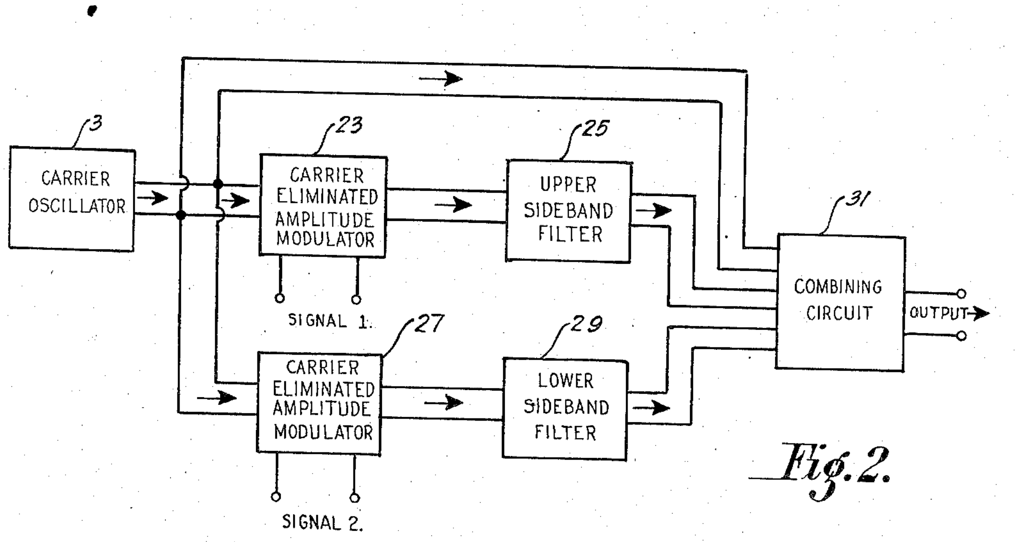
Fig. 2 is a schematic representation, also in block form, of a single-sideband modulator suitable for use in the transmitter of Fig. 1.

Although the specific circuits represented by the blocks in Fig. 1 may assume many of the conventional circuit arrangements it is herein deemed desirable to include a representative circuit arrangement for the dual single-sideband modulator. In Fig. 2 one such arrangement is shown. The carrier oscillator 3 supplies a carrier frequency voltage to a carrier-eliminated amplitude modulator 23. The circuit 23 may comprise a balanced modulator such that modulating signal 1 combines with the carrier frequency to provide upper and lower sideband outputs. Upper sideband filter 25 is provided to select and pass only the upper sideband appearing in the output of modulator 23. In similar manner signal 2 is combined in the balanced modulator 27 with the carrier to provide upper and lower sidebands. Lower sideband filter 29 selects and passes the lower sideband developed in modulator 27. The upper and lower sidebands passed by filters 25 and 29 are introduced into a combining circuit 31, along with a portion of the carrier frequency output of oscillator 3. Combining circuit 31 may comprise a typical summation circuit such that the resultant wave of equation 2 is produced in the output thereof. Preferably the power level of the carrier frequency is reduced below the normal power level of a carrier employed with conventional double-sideband transmission. This reduction may, for example, measure 10 db below a normal carrier level for double sideband transmission. Hence the carrier is merely transmitted as a pilot frequency to control the AVC of the receiving system and the AFC of the receiver oscillator. However, in the instant invention the partially suppressed carrier serves to maintain the transmitter tubes loaded during periods of idle modulation and thereby excessive plate dissipation is prevented in the transmitter tubes.

It should now be apparent that the output of combining circuit 31 represents a modulated wave comprising the carrier and a single-sideband (in the case of single signal input). Equation 2 represents this wave. In the case of double signal input, the output from combining circuit 31 represents a wave comprising the carrier and the separately-derived upper and lower sidebands. Thus in the circuit of Fig. 1 amplitude modulator 9 combines the components of the resultant wave along with the master oscillator frequency to develop frequencies in accordance with those originally present in the single-sideband modulator 1. Hence the transmission output from modulator 9 may comprise a carrier accompanied by either one or two sidebands.

Figure 3:
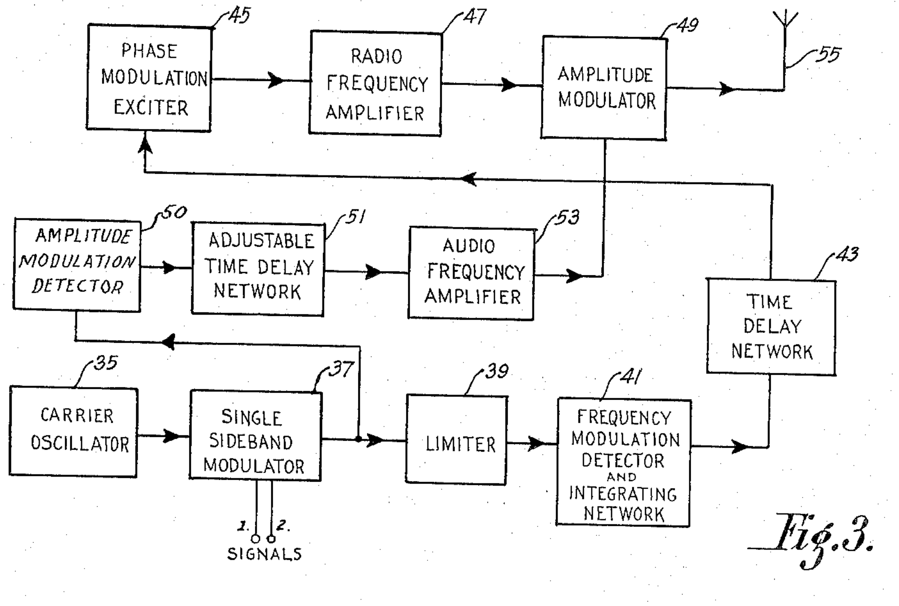
Fig. 3 shows a modified form of the transmitter of Fig. 1.

In the modified form of the transmitter of Fig. 1 shown in Fig. 3, a source of carrier frequency voltage is derived from carrier oscillator 35 and supplied to a single-sideband modulator 37 along with the signals to modulate this carrier. The output of modulator 37 comprises a resultant wave in accordance with equation 2. A limiter 39 is provided to eliminate the amplitude modulation component and pass the phase modulation component to a frequency modulation detector and integrating network 41. The frequency modulation detector and integrating network 41 replaces the phase modulation detector 13 of Fig. 1. With such a detector it is no longer necessary to supply the carrier frequency to operate the detector; the frequency modulation detector may comprise a balanced detector or discriminator having a pair of input circuits tuned respectively above and below this carrier frequency. The voltage representative of the phase modulation component is then passed through a time delay network 43 to a phase modulation exciter 45. This exciter is identical to the exciter 17 of Fig. 1 and the phase modulated carrier output from exciter 45 is amplified in radio frequency amplifier 47 and fed to amplitude modulator 49 in the manner explained in connection with Fig. 1. In this embodiment, as in the circuit of Fig. 1, a portion of the output of single-sideband modulator 37 also supplies the input to an amplitude modulation detector 50, the output of which feeds an adjustable time delay network 51. The delayed signal is then amplified in audio frequency amplifier 53 and fed to amplitude modulator 49 in proper relation to the phase modulation component.

The synchronization of arrival of corresponding phase and amplitude components of modulation is attained by the time delay networks 51 and 43. In the circuit of Fig. 3 time delay network 43 presents a constant time delay to the phase modulation component. This is an undue or over-delay of the phase modulation component. Hence, the proper amount of delay may be provided for the amplitude modulation component by adjusting the network 51. It should be recognized that the delay networks each operate upon audio frequency voltages and hence are relatively simple as contrasted with delay networks for radio frequency voltages. For example, the problem of tuning the networks is substantially eliminated.

As is described in connection with Fig. 1 the output of amplitude modulator 49 is transmitted from antenna 55. This output is a pair of sidebands together with a suppressed carrier as was described in connection with Fig. 1.

Some of the modifications included in the showing of Fig. 3 may be incorporated into the transmitter of Fig. 1. For example, the time-delay equalizer 15 of Fig. 1 could be constructed to effect an over-delay of the phase modulation component traveling to phase modulation exciter 17. The circuit of Fig. 1 would then include an adjustable time-delaying network of the character shown at 51 in Fig. 3. This delay network could be interposed between detector 5 and amplifier 7 or between amplifier 7 and modulator 9 in the transmitter of Fig. 1. Also the phase modulation detector 13 of Fig. 1 could be replaced by the frequency modulation detector and integrating network 41 of Fig. 3. If this replacement were made the connection for supplying carrier frequency voltage from oscillator 3 to phase modulation detector 13 could be eliminated as has already been explained. Also, as has been mentioned the transmitter of Fig. 1 is capable of supplying single-sideband transmission when only a single signal is introduced into modulator 1. Under the same condition the transmitter of Fig. 3 may also provide an output comprising a single-sideband and suppressed carrier.

Figure 4:
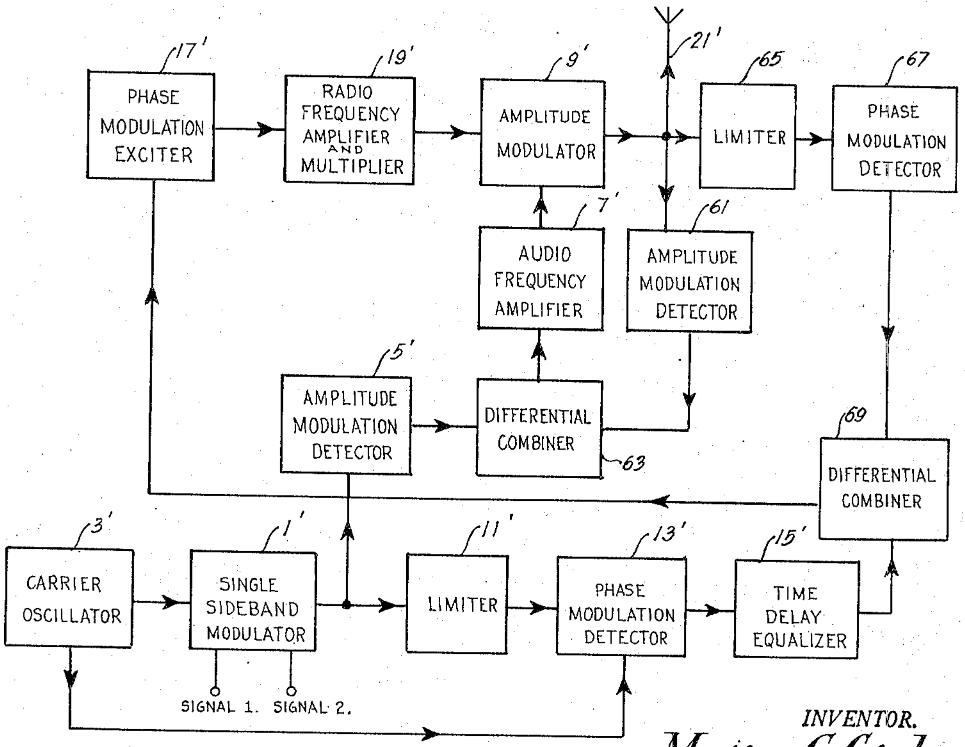
Fig. 4 shows an embodiment of the present invention similar to Fig. 1 but including automatic feedback control.

In Fig. 4 there is shown the transmitter of Fig. 1 provided with feedback circuitry for controlling the transmission output. In this figure the same members primed, designate parts corresponding to Fig. 1, throughout the following description. Each of the units so designated functions in the manner described in connection with with Fig. 1 and accordingly only the added components will be described in connection with the transmitter of Fig. 4.

Referring now to Fig. 4, an amplitude modulation detector 61 is connected to receive a portion of the transmission output from modulator 9'. The amplitude modulation component voltage derived from detector 61 is applied to a differential combiner 63. The output of amplitude modulation detector 5', which is a voltage representative of the amplitude component of modulation derived from single sideband modulator 1', is also supplied to the differential combiner 63. The output of differential combiner 63 is connected to supply the modified component of amplitude modulation to amplitude modulator 9' through audio frequency amplifier 7'.

The differential combiner 63 in its simplest form could comprise a pair of resistors respectively supplied with voltages representative of the amplitude component derived from single sideband modulator 1′ and the amplitude component of modulation derived from the output of modulator 9′. It is the difference magnitude of these voltages which is applied to the modulator 9′ thereby to effect the insertion of the proper amplitude component of modulation. In similar manner, the component of phase modulation appearing in the output of the transmitter of Fig. 4 is compared with the phase modulation component derived from single sideband modulator 1′ and the voltage resulting from this comparison is applied to the phase modulation exciter 17′ to supply the proper component of phase modulation to be introduced into amplitude modulator 9′. A limiter 65 is provided to eliminate amplitude modulation from a portion of the transmitter output and to pass the phase modulated carrier to a phase modulation detector 67. The output voltage derived from the phase detection process is applied to differential combiner 69 along with the phase modulation component voltage obtained from single sideband modulator 1′. As was described in connection with differential combiner 63 the combiner 69 may also comprise a pair of resistors adapted to supply the difference voltage derived from the comparison of the output and input components of phase modulation. It is this difference voltage which supplies phase modulation exciter 17′ with the phase component of modulation.

It should be understood that the transmitter of Fig. 4 may provide either a single-sideband or double-sideband output depending upon the signal input. If the single-sideband modulator of Fig. 2 is employed as a single-sideband modulator 1′ then signal 1 provides the upper sideband modulation and signal 2 provides the lower sideband modulation. However, it is to be realized that the elimination of either signal 1 or signal 2 serves only to eliminate the corresponding sideband from the output of the transmitter.

In line with the foregoing the circuit of Fig. 4 provides automatic control of the transmission output even when frequency multiplication is employed in the transmitter. For example, as many stages of frequency multiplication as is desired may be employed between the phase modulation exciter 17′ and the amplitude modulator 9′ and only the degree of phase modulation applied by exciter 17 need be reduced commensurate with the degree of frequency multiplication employed. Thus in the drawing radio frequency amplifier 19′ may include the desired frequency multiplying circuits. This is because the differential combiner 69 compares voltages as to magnitudes only. However, in the feedback or loop circuit for the phase modulation component voltages it is to be understood that the ordinary principles of feedback operation obtain, and hence to achieve the desired cancellation of distortion, the gain around this loop should be high. This is accomplished by constructing the phase modulation exciter 17′ to be quite sensitive to the output voltage obtained from differential combiner 69. Thus proper correspondence is provided between the component of phase modulation derived from the modulator 1′ and the error or feedback voltage applied by detector 67. Likewise the feedback or loop circuit for the voltages representative of the amplitude component of modulation should provide high gain to reduce distortion to a minimum. Thus audio frequency amplifier 17′ is located between differential combiner 63 and amplitude modulator 9′. Obviously if desired a further audio frequency amplifier could be provided between amplitude modulation detector 5′ and differential combiner 63 in the manner shown in Fig. 1.

The feedback provisions as shown in Fig. 4 may be readily employed with the transmitter of Fig. 3. Likewise the modifications disclosed in the transmitter of Fig. 3 may be incorporated into the transmitter of Fig. 4 in like manner to that described in connection with the incorporation of these features into the transmitter of Fig. 1.

A feature of the transmission system of the present invention which should now be apparent is that of flexibility. Since the single sideband generator may be contained in a separate unit the frequency developed therein may be determined as desired. Likewise the master oscillator or phase modulation exciter may be adjusted to provide carrier output frequency as required. Hence, frequency multiplication may be employed throughout the transmission system of the present invention. It should further be realized that the transmission system of the present invention is adapted to operate upon all forms of amplitude modulated waves which have both a phase and an amplitude component to be preserved.

It should now be apparent that the present invention provides apparatus suitable for adapting existing transmitters for sideband transmission. For example, in Fig. 1 the phase modulation exciter 17, radio frequency amplifier 19, and amplitude modulator 9 may comprise an existing transmitter which it is desired to convert to sideband transmission. Hence, the remaining essential units shown in Fig. 1 may be included in a single assembly adapted for connection to the exciter and amplitude modulator to effect the conversion. Likewise, the circuits of Figs. 3 and 4 incorporate similar possibilities. Thus it is deemed within the scope of the present invention to provide complete single or twin sideband transmission circuits, as well as, adapting circuits for connection to existing transmitters to provide sideband transmission.

What is claimed is:

1. A sideband transmitter comprising a source of carrier frequency supply, a modulator connected to receive carrier energy from said source, said modulator having input signal connections adapted to receive input signal energy for modulation of the carrier energy to produce in single-sideband fashion a resultant wave having instantaneous amplitude and phase modulation components, amplitude detector means connected to the modulator to receive the resultant wave and continuously derive the amplitude modulation components therefrom, further detector means also connected to the modulator to receive the resultant wave and continuously derive the phase modulation components therefrom, phase modulation exciter means connected to receive as an input the phase modulation components from the further detector means to provide a second carrier frequency wave modulated in accordance with the derived phase modulation components, radio frequency amplifying means for increasing the power level of the modulated second carrier, audio frequency amplifying means for increasing the power level of the amplitude modulation components, further modulating means connected to receive the amplified amplitude modulation components and the amplified second carrier, and means in the phase modulation signal path following the further detector for providing coincidence of associated amplitude and phase modulation components in the further modulating means.

2. The transmitter of claim 1 wherein the means for providing coincidence of associated amplitude and phase modulation components comprises a time delay network interposed between the further detector means for deriving phase modulation components and the phase modulation exciter means.

3. The transmitter of claim 1 wherein the means for providing coincidence of the associated amplitude and phase modulation components comprises a time delay network interposed between said further detector means and the phase modulation exciter means, and an adjustable time delay network interposed between the detector means for deriving amplitude modulation components and the further modulating means.

4. In a sideband transmitter of a type employing a single-sideband exciter which produces a resultant wave having components of amplitude modulation and components of phase modulation derived from the combined input carrier and signal energy, the combination which comprises means for deriving by detection the amplitude modulation components, means for deriving by detection the phase modulation components, phase modulation exciter means responsive to the so-detected phase modulation components to provide a phase modulated carrier, amplifying means for increasing the power level of the phase modulated carrier, modulating means connected to receive the so-detected amplitude modulation components and the amplified phase modulated carrier to provide sideband and carrier output for transmission, and means included in the phase modulation signal path for providing coincidence of associated amplitude and phase modulation components in the modulating means.

5. The combination as claimed in claim 4 including second amplitude modulation detector means responsive to a portion of the transmission output, differential combiner means interposed between the first mentioned amplitude modulation detector means and the modulating means and connected to modify the amplitude components of modulation introduced into the modulation means in accordance with the difference voltage derived from the comparison of the detected amplitude modulation components, second phase detector means responsive to a portion of the transmission output, second differential combiner means interposed between the first mentioned phase modulation detector means and the phase modulation exctier means and connected to modify the phase components of modulation introduced into the phase modulation exciter means in accordance with the difference voltage derived from the comparison of the detected phase modulation components.

6. The combination as claimed in claim 5 including amplitude limiting means interposed in the input of each of said phase modulation detector means to select and pass only the respective phase modulated carrier components.

7. The combination as claimed in claim 5 wherein the amplifying means comprise at least one radio frequency amplifier stage and including at least one audio frequency amplifier stage interposed between the first mentioned amplitude detector means and the modulating means.

8. The combination as claimed in claim 5 including frequency multiplying means interposed between the phase modulation exciter means and the modulating means.

9. The combination as claimed in claim 5 wherein the means for providing coincidence of associated amplitude and phase modulation components comprises a time delay network interposed between the first mentioned phase modulation detector means and the second differential combiner means.

10. A single-sideband transmitter comprising in combination a source of carrier frequency supply voltage, a single-sideband modulator connected to receive carrier frequency voltage from said source, means for applying a signal voltage to the single-sideband modulator whereby the output derived from said modulator comprises a resultant voltage wave having components of amplitude and phase modulation, means for deriving by detection the phase modulation component of the resultant wave, phase modulation exciter means including a master oscillator responsive to the derived phase modulation component to provide a second carrier modulated in accordance with the derived phase modulation component, means for increasing the power level of said second modulated carrier, amplitude modulator means connected to receive said second modulated carrier of increased power level, means for deriving by detection the amplitude modulation component of the resultant wave, means for applying the derived amplitude modulation component to the amplitude modulator means to modulate said second modulated carrier, and audio frequency responsive means in the phase modulation path for providing coincidence of associated amplitude and phase modulation components in the amplitude modulator means.

11. The transmitter of claim 10 wherein the means for applying the derived amplitude modulation component to the amplitude modulator means comprises an audio frequency amplifier and the means for increasing the power level of said second modulated carrier comprises a type C radio frequency amplifier.

12. The transmitter of claim 10 wherein the means for providing coincidence of associated amplitude and phase modulation components comprises a time delay network interposed between the means for deriving by detection the phase modulation component and the phase modulation exciter.

13. The transmitter of claim 10 wherein said means for detecting the phase modulation component comprises a frequency modulation detector and integrating network.

14. A sideband transmitter capable of supplying dual sideband modulation wherein each of the sidebands provides a separate communication channel comprising in combination a source of carrier frequency supply voltage, a dual single-sideband modulator connected to receive carrier frequency voltage from said source, means for introducing a pair of modulating signal voltages into said dual single-sideband modulator whereby the output voltage derived from said modulator comprises a resultant voltage wave having associated instantaneous components of amplitude and phase modulation each determined relative to the carrier frequency voltage, means responsive to at least a portion of the resultant wave to derive a voltage in accordance with the phase modulation components therefrom, means responsive to at least a portion of the resultant wave to derive a voltage in accordance with the amplitude modulation component therefrom, phase modulation exciter means including a master carrier frequency oscillator responsive to the voltage derived in accordance with the phase modulation component to provide a master phase modulated carrier voltage, means for increasing the power level of the master modulated carrier voltage, amplitude modulating means for combining the voltage derived in accordance with the amplitude modulation component and the master modulated carrier voltage to provide a transmisson output voltage, detector means responsive to a portion of the output voltage for deriving a voltage in accordance with the amplitude modulation thereof, means for modifying the voltage derived in accordance with the amplitude modulation component of the resultant voltage by the voltage derived from the amplitude modulation of the output wave to control the amplitude modulation voltage supplied to the amplitude modulating means, detector means responsive to a portion of the output voltage for deriving a voltage in accordance with the phase modulation thereof, means for modifying the voltage derived in accordance with the phase modulation component of the resultant wave by the voltage derived from the phase modulation of the output wave to control the phase modulation exciter means, and means for providing coincidence of associated amplitude and phase modulation component voltages in the modulating means.

15. The sideband transmitter of claim 14 including means for multiplying the frequency of said master modulated carrier whereby the degree of phase modulation of the master modulated carrier corresponds to the degree of phase modulation of the resultant wave.

16. The method of sideband transmission which comprises the steps of combining signal and carrier energy to develop a resultant wave having instantaneous amplitude and phase components of modulation, selectively detecting the respective components of modulation, developing a master carrier phase modulated in accordance with the phase component of modulation, increasing the power level of the master modulated carrier, combining in precise coincidence the master modulated carrier of increased power level and the detected amplitude component of modulation to provide a transmission output modulated in accordance with said signal energy.

17. The method of sideband transmission as set forth in claim 16 and including the further steps of selectively detecting a portion of the transmission output to obtain the respective phase and amplitude components of modulation thereof, modifying respectively the phase and amplitude components of modulation derived from the resultant wave by the detected portions of the transmission output to cause the signal energy of the resultant wave to be accurately reproduced in the transmission output.

18. The method of sideband transmission as set forth in claim 17 including the further step of frequency multiplying the master modulated carrier.

19. For use in conjunction with a transmitter in which there is included a phase modulation exciter, frequency multipliers, amplifiers, and an amplitude modulator; the combination comprising, a single-sideband modulator, an amplitude envelope detector and a phase modulation detector each connected to receive a portion of the output from said single-sideband modulator, and circuits for feeding the output of the amplitude envelope detector to the amplitude modulator of said transmitter and the output of the phase modulation detector to the phase modulation exciter of said transmitter.

20. Circuit arrangements for adapting a conventional phase modulation transmitter of the type including a phase modulation exciter, frequency multipliers, audio and radio-frequency amplifiers and an amplitude modulator for single-sideband transmission comprising in combination, a source of carrier frequency supply voltage, a single-sideband modulator connected to receive carrier frequency voltage from said source, means for applying signal energy to the single-sideband modulator to provide output voltages in the form of a resultant voltage wave having components of amplitude and phase modulation, means for deriving by detection the amplitude modulation component of the resultant voltage wave and for applying the so-derived wave energy through said audio frequency amplifier to said amplitude modulator, and means for deriving by detection the phase component of modulation of the resultant voltage wave and for applying the so-derived energy to said phase modulation exciter.

21. The circuit arrangements claimed in claim 20 including differential combiner means interposed between the means for deriving by detection the phase modulation component and the phase modulation exciter, second phase modulation detector means connected to receive the output from the amplitude modulator and apply the so-detected energy to the differential combiner, second differential combiner means interposed between the means for deriving by detection the amplitude modulation component and the amplitude modulator, and second amplitude modulation detector means also connected to receive the output from the amplitude modulator and apply the so-detected energy to the second differential combiner.

22. Circuit arrangements for adapting a conventional phase modulation transmitter of the type including a phase modulation exciter, a frequency multiplier, audio and radio frequency amplifiers, and an amplitude modulator for single-sideband transmission comprising in combination, a source of carrier frequency supply voltage, a single-sideband modulator connected to receive carrier frequency voltage from said source, means for applying signal energy to the single-sideband modulator to provide output voltages in the form of a resultant voltage wave having components of amplitude and phase modulation, audio frequency envelop detecting means connected to the single-sideband modulator to receive the resultant wave and obtain therefrom the component of amplitude modulation, means for applying the so-obtained component of amplitude modulation through the audio frequency amplifiers to the amplitude modulator, phase detecting means also connected to the single-sideband modulator to receive the resultant wave and obtain therefrom the component of phase modulation, means for applying the so-obtained component of phase modulation to the phase modulation exciter, and a radio frequency time delay network effective to delay the component of phase modulation to provide coincidence of arrival of associated components of phase and amplitude modulation at the amplitude modulator.

23. The circuit arrangements claimed in claim 22 including an audio frequency time delay network effective to delay the component of amplitude modulation and wherein at least one of said time delay networks is adjustable.

24. A sideband transmitter comprising a source of carrier frequency supply, a modulator connected to receive carrier energy from the source and separate input signal energy to produce a resultant wave having instantaneous amplitude and phase modulation components, amplitude modulation detector means responsive to the resultant wave for continuously deriving instantaneous amplitude modulation components therefrom, a limiter and phase modulation detector means also responsive to the resultant wave for continuously deriving phase modulation components therefrom, phase modulation exciter means responsive to the derived phase modulation components to provide a second carrier wave modulated in accordance with the derived phase modulation components, radio frequency amplifying means for increasing the power level of the modulated second carrier, further modulating means connected to receive the derived instantaneous amplitude modulation components and the modulated second carrier to provide a transmission output modulated in accordance with the signal energy and means providing coincidence of associated amplitude and phase modulation components in the further modulating means.

25. A sideband transmitter comprising a source of carrier frequency supply, a modulator connected to receive carrier energy from the source and separate input signal energy to produce a resultant wave having instantaneous amplitude and phase modulation components, means responsive to the resultant wave for continuously deriving instantaneous amplitude modulation components therefrom, a limiter and a frequency modulation detector and integrating network also responsive to the resultant wave for continuously deriving phase modulation components therefrom, phase modulation exciter means responsive to the derived phase modulation components to provide a second carrier wave modulated in accordance with the derived phase modulation components, radio frequency amplifying means for increasing the power level of the modulated second carrier, further modulating means connected to receive the derived instantaneous amplitude modulation components and the modulated second carrier to provide a transmission output modulated in accordance with the signal energy and means providing coincidence of associated amplitude and phase modulation components in the further modulating means.

References Cited in the file of this patent

UNITED STATES PATENTS

| | | |
|---|---|---|
| 2,439,661 | Keever | Apr. 13, 1948 |
| 2,666,133 | Kahn | Jan. 12, 1954 |